United States Patent
Moody

[19]

[11] Patent Number: 6,073,402
[45] Date of Patent: Jun. 13, 2000

[54] PORTABLE DOCK SEAL

[75] Inventor: Ralph W. Moody, New Berlin, Wis.

[73] Assignee: Kelley Company, Inc., Mequon, Wis.

[21] Appl. No.: 09/134,295

[22] Filed: Aug. 13, 1998

[51] Int. Cl.[7] .................................................... E04D 5/06
[52] U.S. Cl. .............................. 52/173.2; 5/709; 5/655.9
[58] Field of Search .............................. 52/173.2; 5/709, 5/655.9, 636

[56] References Cited

U.S. PATENT DOCUMENTS

| | | | |
|---|---|---|---|
| 1,928,806 | 10/1933 | Barcato | 5/636 X |
| 3,303,615 | 2/1967 | O'Neal | 52/173.2 X |
| 3,641,604 | 2/1972 | Eggert, Jr. | 52/173.2 X |
| 4,724,648 | 2/1988 | Diepholder | 52/173.2 |
| 4,924,541 | 5/1990 | Inagaki | 5/636 X |
| 5,125,196 | 6/1992 | Moody | 52/173.2 |
| 5,566,682 | 10/1996 | Yavitz | 5/636 X |

*Primary Examiner*—Carl D. Friedman
*Assistant Examiner*—Phi Dieu Tran A
*Attorney, Agent, or Firm*—Michael Best & Friedrich LLP

[57] ABSTRACT

A portable dock seal including a bottom portion adapted to be positioned on a surface, two side walls extending upward from opposing sides of the bottom portion at an angle of at least 20° and less than 90° relative to the bottom portion, and end walls interconnecting the bottom portion with the side walls. Preferably, the bottom portion, side walls, and end walls form an outer shell made from a flexible material (e.g., vinyl-coated polyester fabric), and the outer shell encloses a flexible core material. The flexible core material includes both a resilient material (e.g., open cell polyurethane foam) and a flexible material (e.g., strips of the same type of material as the outer shell). The outer shell includes vent openings to allow air to exit and enter the seal when the seal is compressed and released. The seal can also include a handle secured to the outer shell and adapted to be engaged by a user to facilitate lifting of the body member. A flexible tether can be secured to the seal (e.g., to the handle) to facilitate connecting the seal to the loading dock.

8 Claims, 3 Drawing Sheets

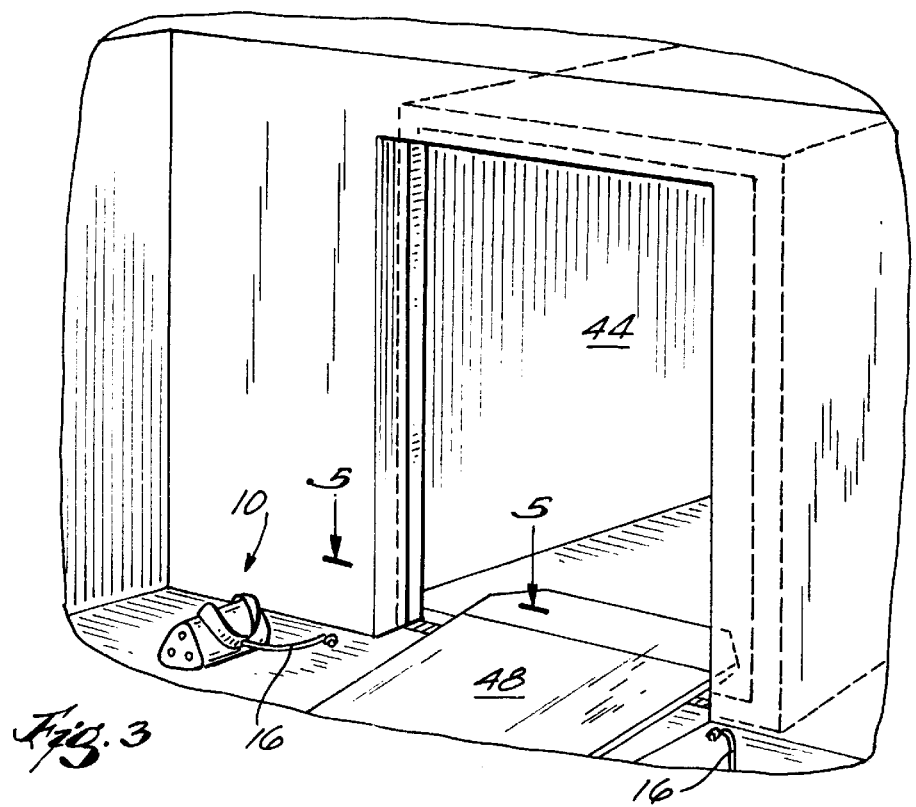
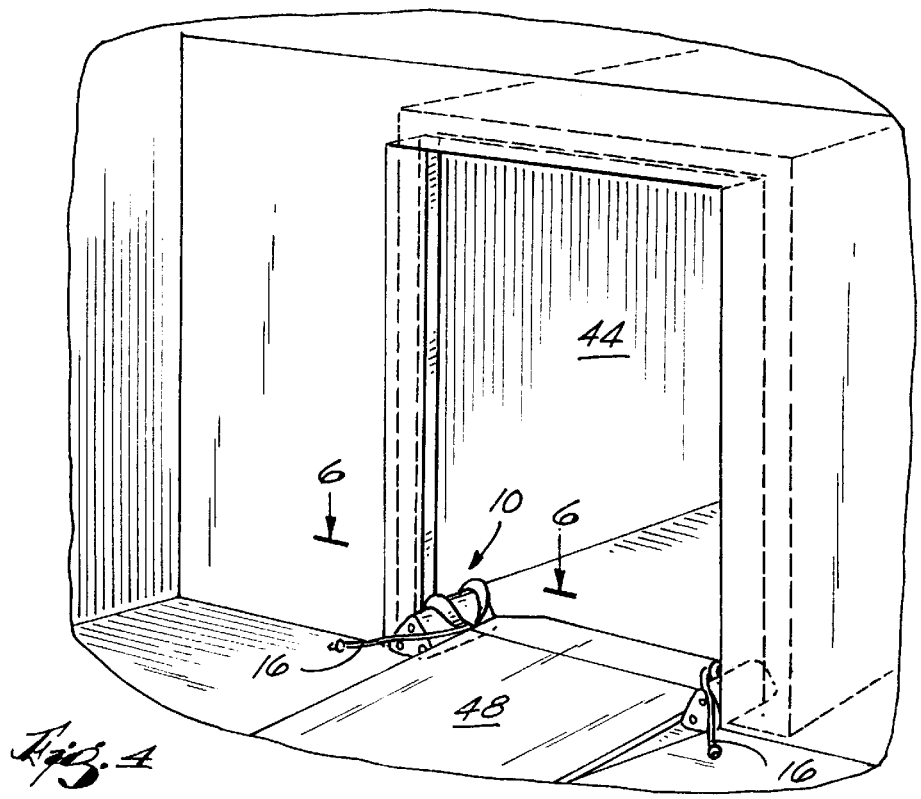

PORTABLE DOCK SEAL

FIELD OF THE INVENTION

The present invention generally relates to the field of loading docks, and specifically to the field of dock seals that are portable in that they can be positioned at various locations around the loading dock.

BACKGROUND OF THE INVENTION

Most warehouses, manufacturing facilities and large retail stores have loading docks that provide a location for loading and unloading trucks and trailers (hereinafter "vehicles"). Loading docks typically include a raised platform and a dock opening positioned above the raised platform. The dock opening is formed by a dock wall having two vertical side portions extending upwardly from the platform, and a horizontal upper portion connecting the top of the side portions. A vehicle can be backed toward the dock opening until the back of the vehicle is abutting the platform. For example, a resilient bumper can be mounted on the face of the platform to provide a cushioned member for the vehicle to be backed against. The platform sometimes includes a dockleveler that provides a ramp between the platform and the bed of the vehicle to facilitate loading and unloading of the vehicle (e.g., by a fork-lift).

Many loading docks include dock seals that provide a seal between the dock wall and the back of the vehicle. For example, such dock seals can include side pads and a head pad mounted (e.g., using fasteners) against the side portions and upper portion of the dock wall, respectively. The pads are commonly made from a wear resistant fabric (e.g., vinyl-coated fabric) surrounding a resilient material (e.g., foam) that is compressed when the back of the vehicle is positioned against the loading dock. The compressed pads provide a barrier against the elements (e.g., wind, rain, and snow), thereby providing a comfortable working environment for the personnel working near the loading dock, and further provide a barrier against the loss of heat or cooling from inside the building.

It has been discovered that, while the above-described pads provide a good seal against the sides and top of the vehicle opening, the seal against the bottom of the vehicle opening is not always ideal. More specifically, since the above-described bumpers maintain a space between the dock wall and the vehicle, there is commonly a gap between the dock wall and the bottom of the vehicle opening on either side of the dock leveler. This gap can allow exchange of interior and exterior air, which can create an uncomfortable working environment and/or result in the loss of valuable climate-controlled air from the interior of the loading dock.

To solve this problem, portable dock seals have been used to block the above-described gap between the vehicle and the dock wall. The portable dock seal can be positioned within the undesired gap to block the exchange of interior and exterior air. Such prior art portable dock seals include a canvas, or similar material shell filled with sand, similar to a bean bag. The sand provides weight to the seal so that it will stay in place, and further makes the seal conform to various shapes to provide a good seal in a variety of positions.

SUMMARY OF THE INVENTION

The above-described portable dock seal is rather heavy due to the use of sand, and if the cover becomes slightly damaged the sand can leak out. In addition, because of the sand, the prior art dock seal lays very flat on the ground. This can make it difficult to use because it requires to user to bend over all the way to the ground in order to pick it up. Furthermore, the flatness of the dock seal makes it difficult to see, which often results in the user forgetting to remove the dock seal before the vehicle drives away. In this event, the dock seal will commonly fall all the way to the ground, requiring the user to exit the loading dock in order to retrieve the dock seal.

The present invention alleviates one or more of the above-noted problems by providing a dock seal that has several independent features, each of which provides a distinct advantage over the above-described dock seal. More specifically, the present invention provides a portable dock seal comprising a bottom portion adapted to be positioned on a surface, two side walls extending upward from opposing sides of the bottom portion at an angle of at least 20° and less than 90° relative to the bottom portion, and end walls interconnecting the bottom portion with the side walls. Preferably, the bottom portion, side walls, and end wall form an outer shell made from a flexible material (e.g., vinyl-coated polyester fabric), and the outer shell encloses a flexible core material. For example, the flexible core material can include both a resilient material (e.g., cellular polyurethane foam) and a flexible material (e.g., strips of the same type of material as the outer shell).

In one embodiment, the outer shell includes vent openings to allow air to exit and enter the seal when the seal is compressed and released. The seal can also include a handle secured to the outer shell and adapted to be engaged by a user to facilitate lifting of the body member. A flexible tether can be secured to the seal (e.g., to the handle) to facilitate connecting the seal to the loading dock.

A specific embodiment of the present invention is illustrated in the attached drawings and described below.

BRIEF DESCRIPTION OF THE DRAWINGS

FIG. 3 is a perspective view of the interior of a loading dock before the portable dock seals have been positioned in place.

FIG. 4 is a perspective view of the interior of a loading dock with the portable dock seals positioned to block the gap between the vehicle and the loading dock.

DETAILED DESCRIPTION

One embodiment of the present invention is illustrated in FIGS. 1–8. The portable dock seal 10 illustrated in FIG. 1 generally includes a body member 12, a handle 14 secured to the body member, and a flexible tether 16 that facilitates interconnecting the dock seal to a substantially static location (e.g., a loading dock), as will be described below in more detail.

Figure 8:
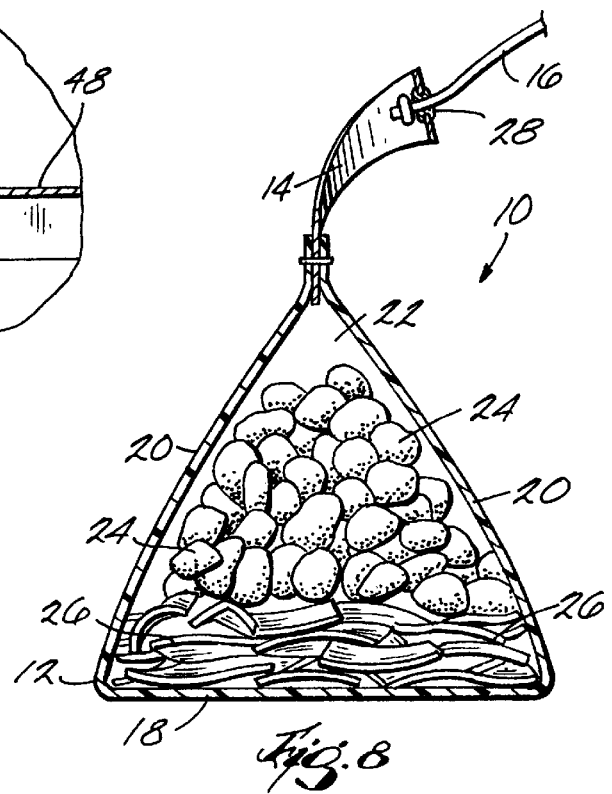
FIG. 8 is a section view taken along line 8—8 in FIG. 1.

Referring to FIG. 8, the illustrated body member includes an outer shell formed by a bottom portion 18, two side walls 20 extending upward from opposing sides of the bottom portion, and two end walls 22 interconnecting the bottom portion with the side walls. The end walls 22 include vents 23 that allow air to exit and enter the body member when it is compressed and expanded, respectively. The side walls preferably extend upward from the bottom portion at an angle of at least 20° and less than 90° relative to the bottom portion. In the illustrated embodiment, the side walls are positioned at an angle of about 60° relative to the bottom portion. The illustrated end walls thus form an equilateral triangle. It should be appreciated that the end walls could be formed into other shapes, such as a trapezoid. The side walls 20 each include a safety label 21 that warns that it is not safe to step on the dock seal 10. In one embodiment, the safety label says "No Step".

Each of the bottom portion, side walls, and end walls is preferably made from a material that is both flexible and durable, such as a fabric material. In the illustrated embodiment, the outer shell is made from 22 ounce vinyl-coated polyester. In an alternative embodiment, the outer shell can be made from Hypalon-coated or neoprene-coated nylon. Hypalon is a trademark of E. I. duPont de Nemours and Company.

The body member further includes a flexible core material that helps to maintain the shape of the outer shell and further provides additional weight to the dock seal. In the illustrated embodiment, the flexible core 9 material includes a resilient material in the form of cellular foam 24 (e.g., open cell or closed cell foam) to help maintain the shape of the outer shell. Cellular foam allows the dock seal to be compressed and molded into various shapes in order to enhance the sealing effect of the dock seal. In addition, the cellular foam is relatively light weight, thereby making the dock seal easy to maneuver. The flexible core material further includes heavier flexible material near the bottom of the outer shell. This helps to bias the seal to maintain a preferred position, i.e., the handle and safety no-step labels are facing upward. In this illustrated embodiment, the heavier flexible material comprises vinyl strips 26. Preferably, these strips are produced from the same material that is used when producing the outer shell. It has been found that the use of about 8 pounds of this material provides a satisfactory result.

Referring to FIG. 8, the illustrated handle is sewn between the two sidewalls. The handle can be any appropriate material, and in the illustrated embodiment the handle comprises the same vinyl-coated material as is used to produce the outer shell. The illustrated handle includes a grommet 28 that facilitates the attachment of the tether.

The tether is attached on one end to the handle and on the other end to the loading dock. The tether insures that the portable dock seal is always available when needed. The tether is preferably made from a flexible material, and in the preferred embodiment is a cable, chain, or rope.

Figure 1:
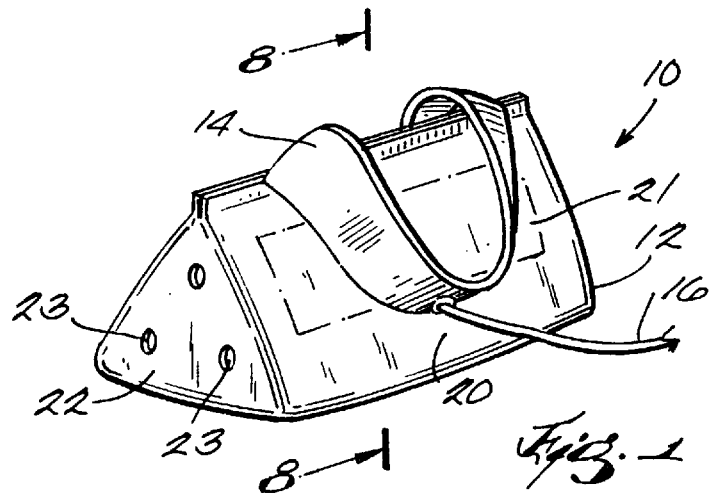
FIG. 1 is a perspective view of a portable dock seal embodying the present invention.
Figure 2:
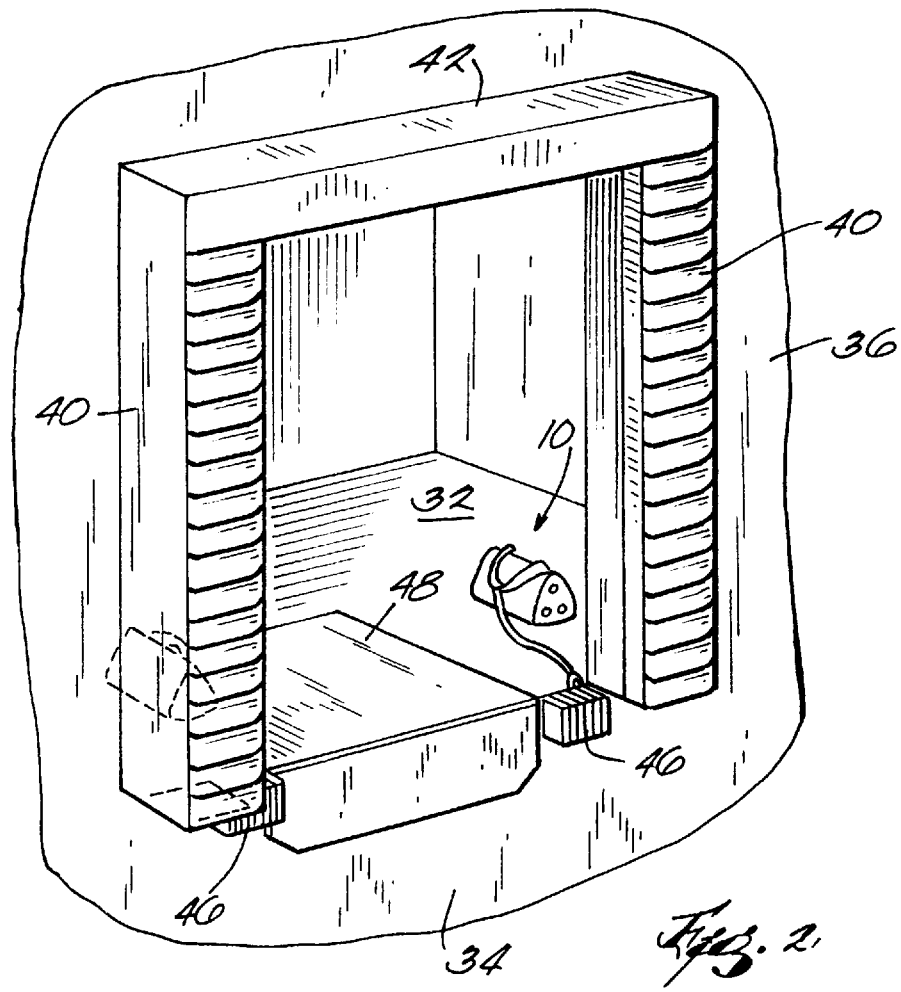
FIG. 2 is a perspective view of the exterior of a loading dock.
Figure 5:
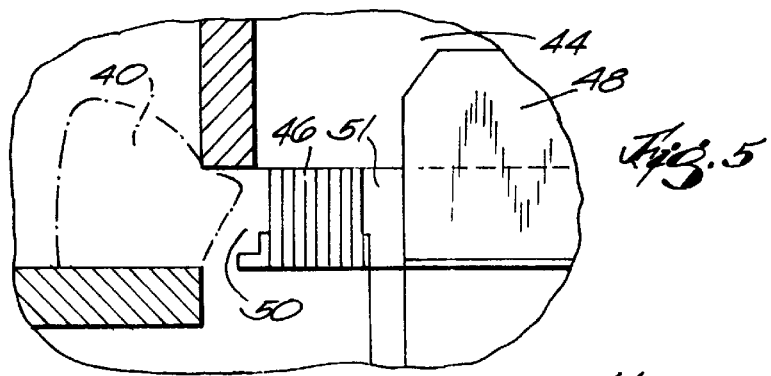
FIG. 5 is a top view taken along line 5—5 in FIG. 3.

Referring to FIG. 2, the above-described portable dock seal is designed to be used at a loading dock having a dock platform 32, a dock face 34, and a dock wall 36 defining a dock opening. The illustrated loading dock further includes side pads 40 and a head pad 42 mounted to the dock wall to provide a seal between the loading dock and a portion of a vehicle 44 backed against the loading dock. The loading dock further includes dock bumpers 46 to limit how close the vehicle can approach the loading dock. The illustrated loading dock further includes a dock leveler 48 to facilitate loading and unloading of the vehicle, as is known in the art. It should be understood that the portable dock seals of the present invention can be used with other types of loading docks such as those with dock shelters.

FIG. 3 illustrates a vehicle backed against the loading dock and the dock leveler resting on the vehicle. In this position, the vehicle is backed against the bumpers, and the side pads and head pad are compressed to provide a seal around three sides of the dock opening. However, referring to FIG. 5, it can be seen that there are non-sealed gaps 50 and 51 between the vehicle, the bumper, the dockleveler, and the dock platform. The size of these gaps vary between loading docks and can provide a location for exterior air (e.g., cold air) to enter the loading dock facility, thereby resulting in an uncomfortable working environment. The gaps can further provide a location for the escape of interior air (e.g., refrigerated air from a refrigerated warehouse facility), thereby resulting in increased energy costs.

Figure 6:
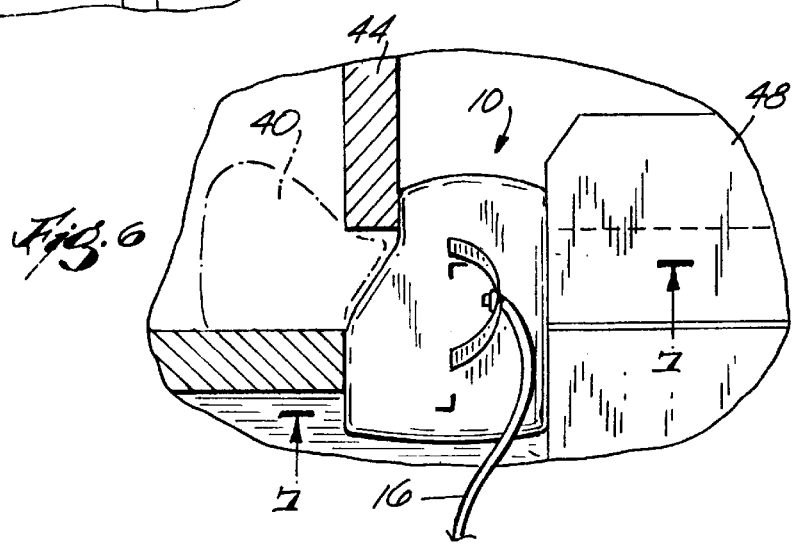
FIG. 6 is a top view taken along line 6—6 in FIG. 4.
Figure 7:
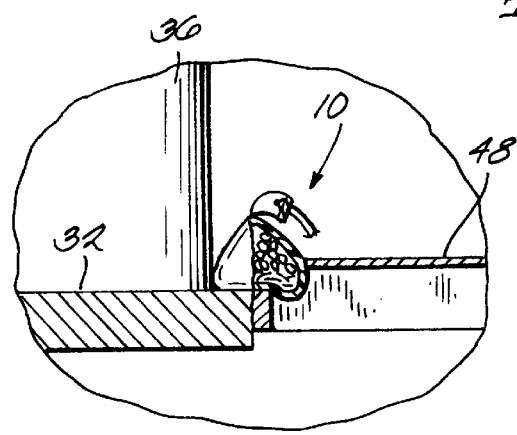
FIG. 7 is a section view taken along line 7—7 in FIG. 6.

FIGS. 4 and 6 illustrate how the portable dock seals can be positioned over the above-noted gaps to substantially block the gaps and inhibit the exchange of interior and exterior air. The portable dock seal can be placed along the edge of the dockleveler to block the gaps, and can be compressed into the gaps between the dock leveler and the dock wall to provide more complete blockage of the gaps, as shown in FIG. 7.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A portable dock seal comprising:
    a bottom portion adapted to be positioned on a surface, said bottom portion comprising a flexible fabric;
    two side walls extending upward from opposing sides of said bottom, said side walls comprising a flexible fabric; and
    at least one end wall interconnecting said bottom portion with said side walls, said end wall comprising a flexible fabric;
    wherein said bottom portion, side walls, and end wall form a flexible outer shell, and wherein said dock seal further comprises a flexible core material positioned within said outer shell, wherein said flexible core material comprises the same type of fabric as said outer shell.

2. A portable dock seal as claimed in claim 1, wherein said end wall is triangular in shape.

3. A portable dock seal as claimed in claim 1, wherein said side walls include a safety label.

4. A portable dock seal as claimed in claim 1, wherein said flexible core material further comprises a resilient material.

5. A portable dock seal as claimed in claim 4, wherein said resilient material comprises a cell foam.

6. A portable dock seal as claimed in claim 1, wherein said flexible core material comprises strips of the same type of fabric as said outer shell.

7. A portable dock seal as claimed in claim 1, wherein said outer shell comprises vinyl-coated polyester fabric.

8. A portable dock seal as claimed in claim 1, further comprising vent openings in said outer shell.

* * * * *